US007922081B2

(12) United States Patent
Ito

(10) Patent No.: US 7,922,081 B2
(45) Date of Patent: Apr. 12, 2011

(54) IDENTIFICATION INFORMATION MANAGING METHOD AND SYSTEM

(75) Inventor: Atsushi Ito, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 947 days.

(21) Appl. No.: 10/594,974

(22) PCT Filed: Apr. 1, 2004

(86) PCT No.: PCT/JP2004/004768
§ 371 (c)(1),
(2), (4) Date: May 7, 2007

(87) PCT Pub. No.: WO2005/101327
PCT Pub. Date: Oct. 27, 2005

(65) Prior Publication Data

US 2007/0241181 A1 Oct. 18, 2007

(51) Int. Cl.

| | |
|---|---|
| ***G06K 5/00*** | (2006.01) |
| ***G06K 7/08*** | (2006.01) |
| ***G06K 19/00*** | (2006.01) |
| ***G06F 7/08*** | (2006.01) |
| ***G06Q 40/00*** | (2006.01) |
| ***G07D 11/00*** | (2006.01) |
| ***G07F 19/00*** | (2006.01) |

(52) U.S. Cl. ........ 235/380; 235/379; 235/381; 235/449; 235/487

(58) Field of Classification Search .................. 235/379, 235/380, 381, 449, 487, 492, 493
See application file for complete search history.

(56) References Cited

U.S. PATENT DOCUMENTS

| | | | | |
|---|---|---|---|---|
| 5,442,165 | A * | 8/1995 | Atsumi et al. | 235/492 |
| 6,617,172 | B2 | 9/2003 | Usami | |
| 6,769,608 | B2 * | 8/2004 | Nishimura | 235/380 |
| 7,076,800 | B2 * | 7/2006 | Nishimura | 726/9 |
| 7,114,179 | B1 * | 9/2006 | Ritter et al. | 726/7 |
| 7,392,226 | B1 * | 6/2008 | Sasaki et al. | 705/64 |
| 7,475,044 | B1 * | 1/2009 | Kawai et al. | 705/65 |
| 2001/0027444 | A1 * | 10/2001 | Mitsuhashi | 705/64 |
| 2002/0029348 | A1 * | 3/2002 | Du et al. | 713/193 |
| 2002/0043565 | A1 * | 4/2002 | Hoshino et al. | 235/492 |
| 2002/0114468 | A1 * | 8/2002 | Nishimura | 380/270 |
| 2003/0097285 | A1 * | 5/2003 | Ghaniem | 705/5 |
| 2003/0208406 | A1 | 11/2003 | Okamoto et al. | |
| 2003/0222137 | A1 * | 12/2003 | Nishimura | 235/380 |
| 2005/0116030 | A1 * | 6/2005 | Wada et al. | 235/382 |
| 2005/0216405 | A1 * | 9/2005 | So | 705/41 |
| 2007/0282690 | A1 * | 12/2007 | Randazza et al. | 705/17 |
| 2008/0121699 | A1 * | 5/2008 | Thorsen et al. | 235/381 |
| 2008/0203157 | A1 * | 8/2008 | Thorsen et al. | 235/382 |

FOREIGN PATENT DOCUMENTS

| | | |
|---|---|---|
| CN | 1346481 | 4/2002 |
| JP | 07-093487 | 4/1995 |
| JP | 11-277963 | 10/1999 |
| JP | 2002-007970 | 1/2002 |
| JP | 2002-184872 | 6/2002 |

* cited by examiner

*Primary Examiner* — Daniel Walsh
(74) *Attorney, Agent, or Firm* — Antonelli, Terry, Stout & Kraus, LLP.

(57) ABSTRACT

A ticket system using an IC card includes a terminal, such as an entrance gate, and a server. A ticket incorporates an IC chip having read-only identification information and the server manages a table of the correspondence between identification information printed on the surface of the ticket and identification information the IC chip has and a table of the correspondence between new identification information and old identification information which are accompanied by a reissue. By distributing data of the correspondence tables to a terminal such as an entrance gate, a cheap ticket system capable of performing mechanical processing can be provided.

6 Claims, 5 Drawing Sheets

IDENTIFICATION INFORMATION MANAGING METHOD AND SYSTEM

TECHNICAL FIELD

The present invention relates to method and system for managing identification information concerning a ticket such as an admission ticket or a registered membership's ticket and more particularly, to method and system for managing identification information concerning a ticket having two kinds of identification information for mechanical processing and for human.

BACKGROUND ART

Recently, in applications to an electronic ticket for railroad (commutation ticket, prepaid card), a lift ticket at a skiing ground or the like, a non-contact IC card has been used by virtue of its convenience.

Also, as a substitute for the non-contact IC card, an admission ticket with non-contact IC, for example, has been proposed as described in JP-A-11-277963. The non-contact IC card is costly per sheet and generally, money is placed on deposit from a utilizer upon issuance and a disuse IC card is collected for reutilization, so that the utilization of a non-contact IC card is difficult to achieve at a booking office of, for example, an ordinary railway ticket or an admission ticket to a movie theater where a great deal of tickets for only a single usage are issued.

On the other hand, as a cheap non-contact IC chip, an IC chip having a recognition number is available as disclosed in JP-A-2002-184872.

In the aforementioned method of JP-A-11-277963, information equivalent to that indicated on the surface of an admission ticket is written in an IC circuit and hence the IC circuit needs to have the function to write, with the result that cheapness is hardly attained to make it difficult to realize a disposable ticket.

The aforementioned method of JP-A-2002-184872 having only the read-only recognition number cannot afford to be applied to the method of JP-A-11-277963 and a method of indicating a recognition number of a chip on the surface of an admission ticket in contrast to JP-A-11-277963 has difficulties in handling on account of the fact that recognition numbers of chips are random.

DISCLOSURE OF INVENTION

An object of the present invention is to provide an inexpensive ticket system which can perform mechanical processing by using an IC chip having a recognition number as disclosed in JP-A-2002-184872.

Another object of the invention is to provide a system which can perform reissue of a ticket in the aforementioned ticket system.

Still another object of the invention is to provide a system for enabling a person other than a ticket issuer to utilize information relating to the aforementioned ticket system with charge or free of charge.

To accomplish the object as above, a center server (for example, management center) according to the present invention provides a table of the correspondence between a ticket ID (a ticket number, for instance) printed on the surface of a ticket for recognition by a human being and an IC chip ID (a chip number, for instance) possessed by an IC chip which is merged with the ticket by being, for example, bonded thereto and has the function to perform total conversion among identification information pieces in the steps such as ticket manufacture, sales, reservations and utilization.

To accomplish the other object as above, an identification information managing server according to the invention provides a table of the correspondence between new and old tickets accompanied by a reissue and has the function to update the correspondence table in response to a reissue request from a reissue terminal and to distribute updated data to various kinds of utilization terminal such as an entrance gate.

To accomplish the further other object as above, an identification information managing server according to the invention has the function to publicize, through the medium of a network, the function of conversion among identification information pieces and the function of notification upon a reissue of ticket, to authenticate a utilizer in response to a request for utilization of the function from the third party and to charge the utilizer for authentication as necessary.

Other objects, features and advantages of the present invention will become apparent by reading a description of the following embodiments thereof in conjunction with the accompanying drawings.

BEST MODE FOR CARRYING OUT THE INVENTION

Figure 1:
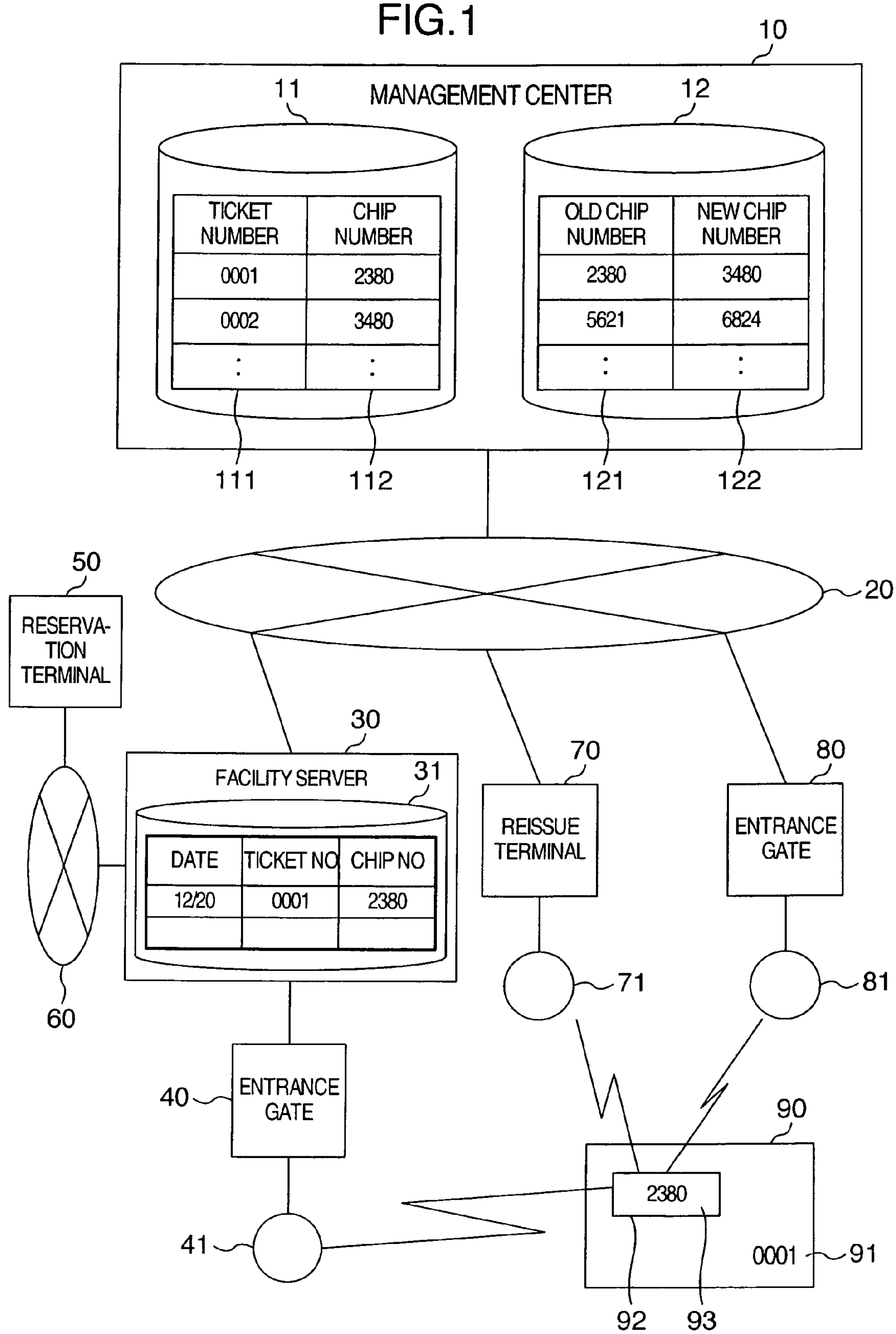
FIG. 1 is a diagram showing the construction of a system according to an embodiment of the present invention.

An embodiment of this invention will now be described in detail with reference to the drawing. FIG. 1 is a diagram showing the construction of a system of the present embodiment representing an admission ticket system based on a ticket having a non-contact IC chip. The present system presupposes a system in which entrance to a meeting place and utilization of individual facilities are managed by a different organization as in the case of an exhibition. An admission ticket 90 includes a non-contact IC chip 92 and the non-contact IC chip 92 has a unique chip number 93 differing chip by chip. And the surface of admission ticket 90 is printed with a ticket number 91. A management center 10 has a database 11 and a database 12 and it is connected to a facility server 30, a reissue terminal 70 and an entrance gate 80 through a network 20. The database 11 is stored with a table of the correspondence between ticket number 111 and chip number 112 concerning each issued ticket and in the case of reissue of a ticket, the database 12 is stored with a chip number 121 of the ticket before reissue and a chip number 122 of a reissued ticket.

The facility server 30 is a server for managing conditions of reservations of facilities in the meeting place and it is connected to the management center 10 through the network 20 and at the same time, to a reservation terminal 50 via a network 60. As examples of the network 60 and the reservation terminal, Internet and a personal computer are conceivable, respectively, but different forms will not be denied.

Further, the facility server 30 is also connected to an entrance gate 40 to the facilities in its charge. The entrance gate 40 can communicate with the non-contact IC chip 92 via a non-contact reader 41 so as to read the chip number 93. A database 31 in the facility server 30 is stored with data for making the correspondence among reservation date, ticket number and chip number, which data has been registered at the time of making a reservation and is utilized at the time of utilizing the facilities.

The reissue terminal 70 is connected to the management center 10 through the network 20 and it can communicate with the non-contact IC chip 92 via a non-contact reader 71 so as to read the chip number 93.

The entrance gate 80 is installed at the entrance to the meeting place of exhibition and it is connected to the management center 10 through the network 20 and besides can communicate with the non-contract chip 92 via non-contact IC reader 81 so as to read the chip number 93.

Figure 2:
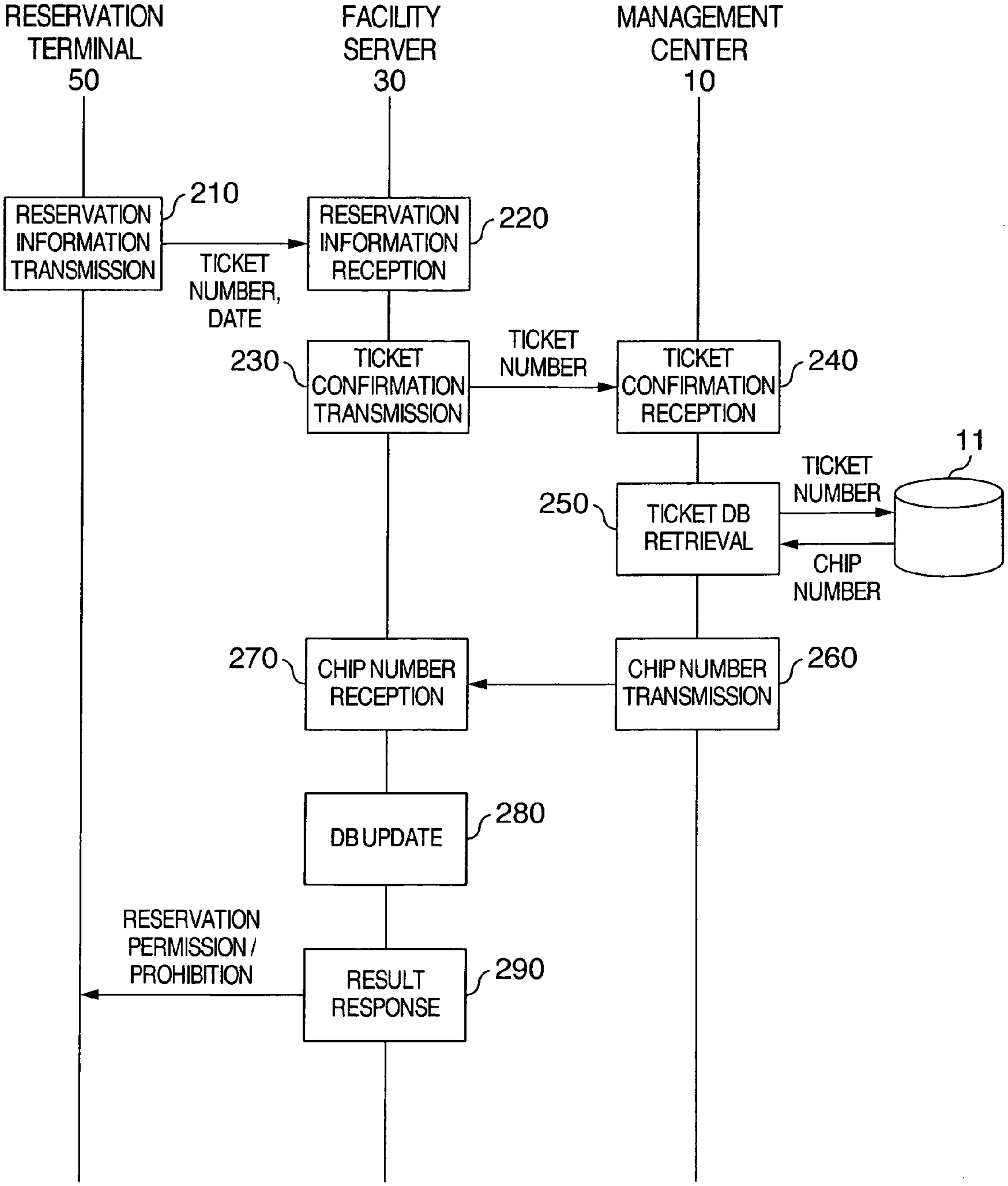
FIG. 2 is a flowchart of system reservations according to an embodiment of the invention.

FIG. 2 is a flow of processing individual entities during facility reservation. A utilizer who purchased a ticket in advance inputs a ticket number 91 described on the ticket and a desired utilization date to the reservation terminal 50. Since the utilizer having purchased the ticket does not have a means for reading the chip number, inputting the ticket number is of importance. The inputted data is transmitted to the facility server in step 210. The facility server having received the reservation information in step 220 transmits a ticket number confirmation request telegram including at least the ticket number to the management center 10 in step 230. The management center 10 having received the ticket number confirmation request telegram in step 240 retrieves in step 250 whether a record corresponding to the received ticket number exists in the database 11. Further, it is conceivable in this phase that an identifier in cipher (check sum), for example, is included in the ticket number and the identifier is checked for compatibility in the management center. In step 260, the management 10 responds to a result in the step 250 to return a response to the effect that the corresponding chip number is available or the ticket number transmitted in the step 230 is a number in existent in the database 11. The facility server 30 having received the above response in step 270 determines that the ticket number is valid when the chip number exists in the response and then, it stores a reservation date, the ticket number and a chip number in the database 31 in step 280 and transmits a message of completion of reservation to the reservation terminal 50 in step 290. In case the chip number does not exist in the response telegram received in the step 270, it is determined that the ticket number is invalid and a message such as "a ticket in question does not exist" is transmitted to the reservation terminal 50 in step 290.

Figure 3:
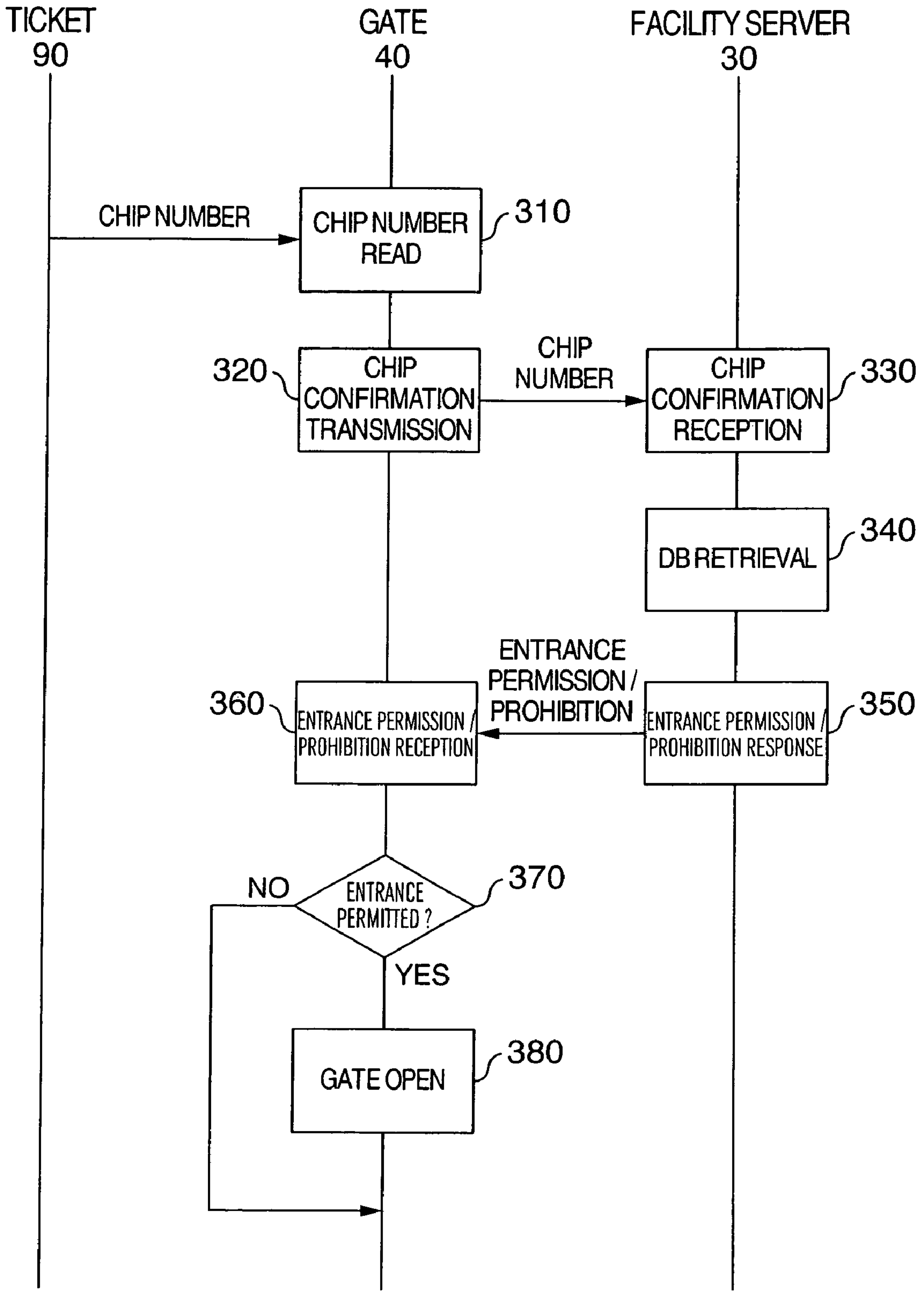
FIG. 3 is a flowchart during entrance according to an embodiment of the invention.

Illustrated in FIG. 3 is how to process the individual entities when a utilizer makes use of reserved facilities. When the utilizer presents a ticket 90 to the entrance gate 40, the entrance gate 40 reads a chip number 93 in step 310 and transmits the data to the facility server 30 in step 320. The facility server 30 having received the telegram in step 330 retrieves in step 340 whether a record corresponding to the chip number 93 exists in the database 31 and if the record is present and its reservation data coincides with the present date, transmits to the gate 40 entrance permission in step 350 but otherwise, entrance prohibition. The gate having received the telegram in step 360 inspects the received telegram in step 370 and opens the gate in step 380 only in the case of entrance permission.

In the foregoing example, the ticket is checked by means of the facility server 30 but for example, by transmitting in advance a chip number scheduled for entrance at that time from the facility server 30 to the entrance gate 40, the aforementioned check can also be carried out in the entrance gate 40.

Figure 4:
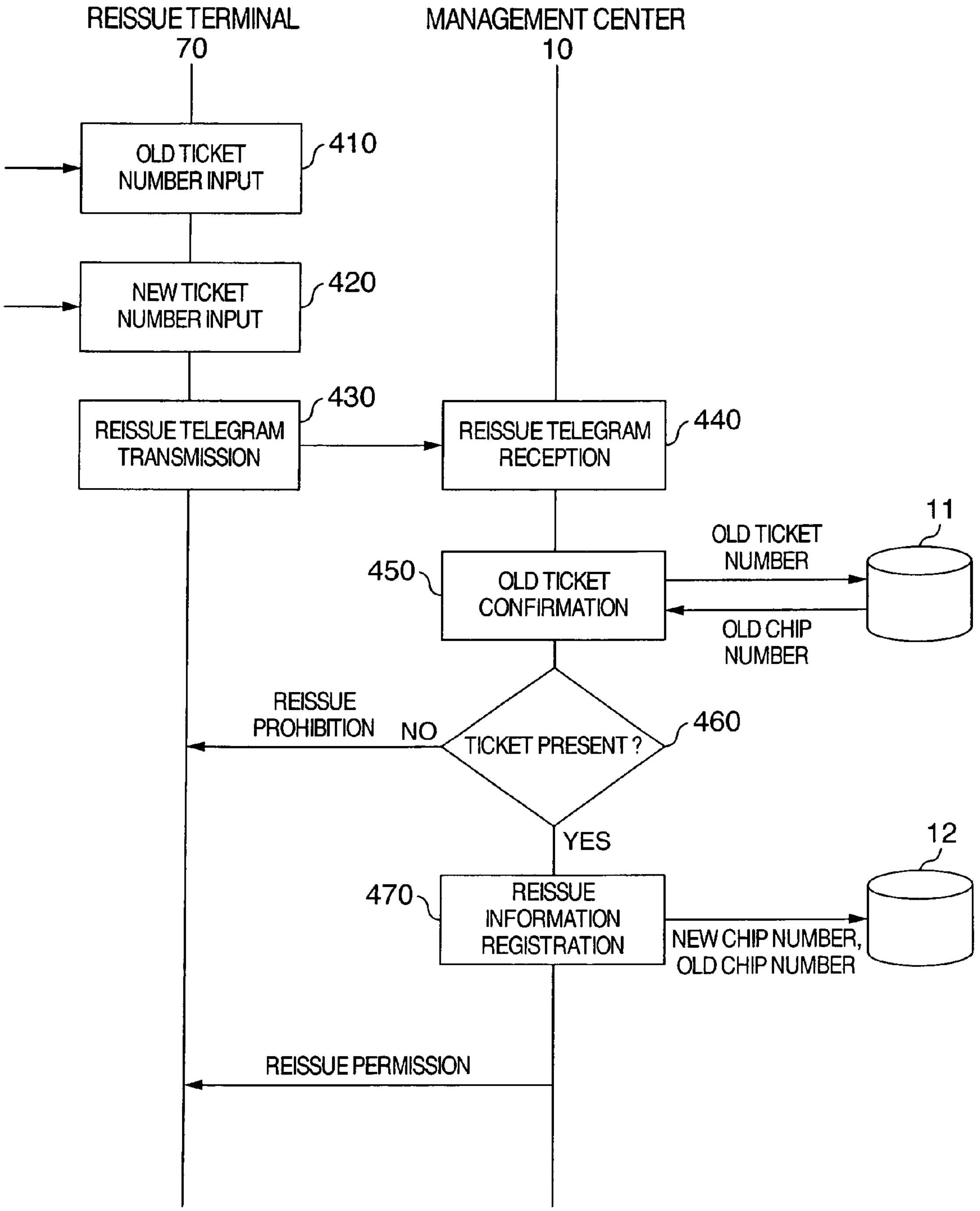
FIG. 4 is a flowchart of ticket reissue registration according to an embodiment of the invention.

Illustrated in FIG. 4 is a flow of processing in the course of ticket reissue. When a utilizer carrying a ticket unreadable owing to, for example, destruction of a non-contact IC chip comes to the reissue terminal 70, an operator of reissue terminal 70 inputs a ticket number of the old ticket in step 410 and then reads a chip number of a new ticket to be reissued through the medium of the non-contact reader 71 in step 420 and transmits a reissue telegram (reissue request message) to the management center 10 in step 430. Needless to say, turns of the steps 410 and 420 can be exchangeable. The management center 10 having received the reissue telegram in step 440 retrieves in step 450 whether the ticket number of the old ticket transmitted to the database 11 exists and then, determines an invalid ticket when the number does not exist so as to transmit in step 460 a message of reissue prohibition but in the presence of the ticket number, stores in step 470 the old chip number and the new chip number received in the step 440 in the database 12 so as to transmit a message of reissue permission to the reissue terminal 70.

In the above example, the chip number of new ticket is read through the non-contact reader 71 in the step 420 but instead, the ticket number of new ticket may be inputted from a keyboard. A method of this type has an advantage that the non-contact reader 71 can be dispensed with at the cost of an increase in the number of operations by the operator of reissue terminal 70. In place of the chip number used in the step 430 and ensuing, the ticket number is used in this type of method.

Figure 5:
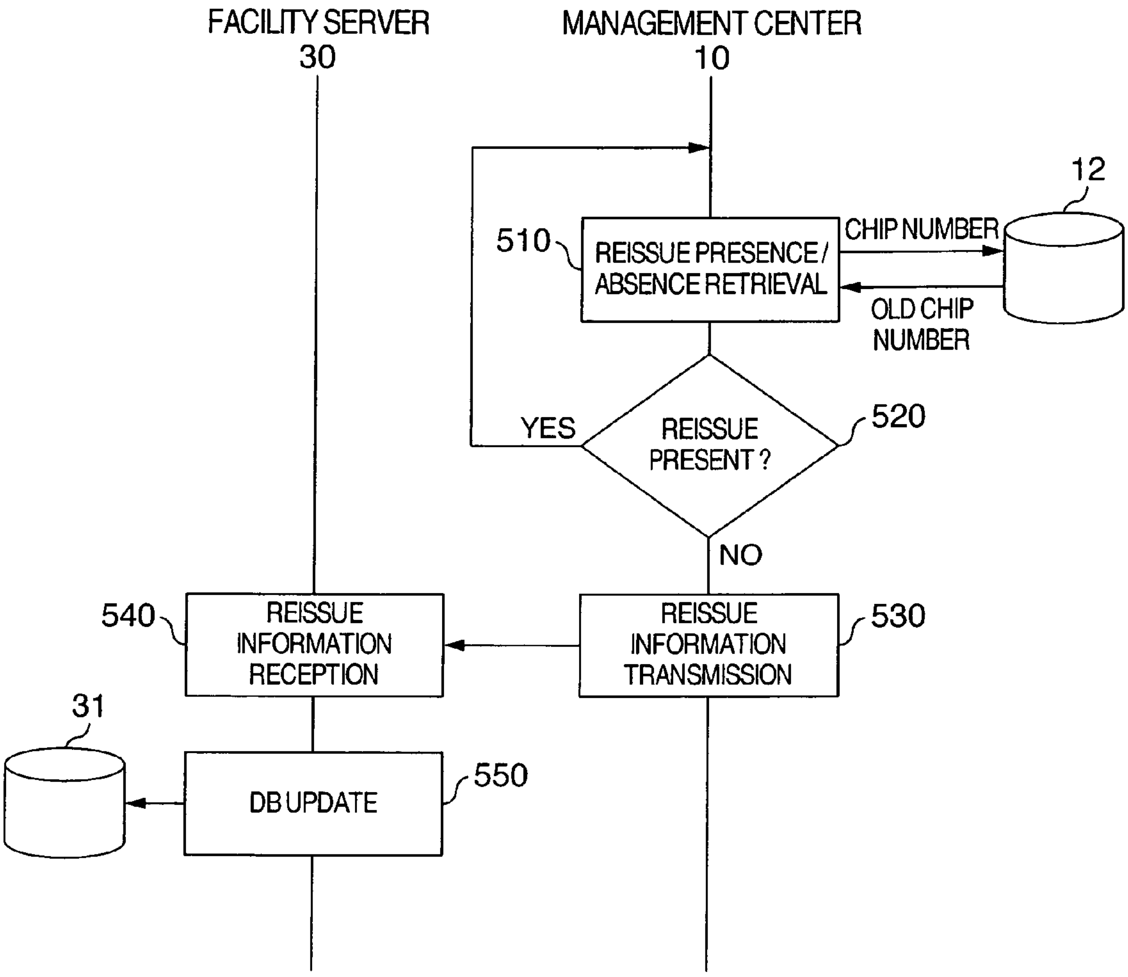
FIG. 5 is a flowchart of ticket reissue notification according to an embodiment of the invention.

FIG. 5 shows a flow of process for causing the management center to inform each facility server of reissue when the reissue is done. In step 510, the management center 10 retrieves a chip number of a ticket before reissue from the database 12. When the retrieval of the chip number before reissue is successful in step 520, the program returns to the step 510 so as to again perform retrieval on the basis of the retrieved chip number before reissue. At the time that any chip number before reissue cannot be retrieved more, reissue information including a list of all chip numbers found till then and a ticket number of a ticket reissued finally is transmitted in step 530 to the facility server 30. The facility server having received the reissue information in step 540 retrieves whether the chip numbers contained in the list of chip numbers exist in the database 31 and if existent, the corresponding record is updated to the information of the finally reissued ticket in step 550. In other words, the facility server 30 recognizes that the ticket number of new ticket and the chip number of new IC chip substituting for the ticket number of old ticket and the chip number of old IC chip are valid and then registers them in the database 31.

In the example as above, the data transmitted in the step 530 is the list of chip numbers before reissue by taking into consideration an instance where delivery of reissue information accompanied by previous reissue fails but for example, when unmistakable delivery of reissue information is guaranteed or when information of tickets managed by the facility server 30 can be steadily grasped as to the time at which the information avails, only one chip number in the list of chip numbers in the data transmitted in the step 530 suffices. Further, in the foregoing example, an instance is presupposed in which distribution of reissue information is carried out as soon as a reissue of a ticket is done and only reissue information concerning one sheet of ticket is distributed as the reissue information but it is conceivable that pieces of ticket information reissued at intervals of constant time through, for example, night batch are distributed collectively.

In the foregoing embodiments, the data managed by the database 12 is the chip number but the chip number makes the one-to-one correspondence with the ticket number and therefore, management of ticket numbers may avail. In that case, it is rational that the reissue information distributed in the step 530 includes a list of past ticket numbers.

The foregoing embodiments have been described by way of the admission ticket but the data managing method and reissue method of the present invention are not limited to the admission ticket but conceivably, they may be applied to various kinds of tickets or cards having two pieces of identification information for mechanical processing and human recognition, for example, an identification card such as employee identification card, a financial card such as credit card, a reservation card of movies or a coupon.

According to the present invention, an inexpensive ticket system can be constructed which can perform the mechanical processing by using a read-only IC chip for only identification information.

Further, according to the invention, even in the event that a ticket reissue becomes necessary because of destruction of the read-only IC chip, for example, a ticket can be reissued by keeping the reservation information succeeded.

Further, according to the invention, the ticket can be managed by not only the ticket number but also the IC chip number and consequently, utilization of an invalid ticket can be inhibited.

The foregoing description has been given of the embodiments but the present invention is in no way limited thereto and it is obvious to those skilled in the art that the invention can be changed and modified in various ways without departing from the spirit thereof and the scope of appended claims.

The invention claimed is:

1. An identification information managing system comprising a reissue terminal unit for accepting reissue of a ticket or card embedded with an IC chip, a local server for managing utilization of said ticket or card, and a center server for managing a ticket/card ID of the ticket or card corresponding to an IC chip ID of said IC chip, wherein said reissue terminal unit reads a new IC chip ID of a new ticket or card after reissue from said new ticket or card and besides receives an input of an old ticket/card ID of an old ticket or card before the reissue so as to transmit to said center server said new IC chip ID and said old ticket/card ID together with a reissue request message;

said center server retrieves whether said old ticket/card ID exists and when determining that said old ticket/card ID exists, transmits to said reissue terminal unit a reissue permission message and transmits to said local server at least one of an old IC chip ID corresponding to said old ticket/card ID and said old ticket/card ID, said new ticket/card ID and said new IC chip ID, together with reissue notification message; and said local server makes said new ticket/card ID and said new IC chip ID valid in place of said old ticket/card ID and said old IC chip ID.

2. An identification information managing system according to claim 1 further comprising a utilization terminal unit for accepting utilization of said ticket or card, wherein said utilization terminal unit receives an input of an ID of said ticket or card from a utilizer of said ticket or card and transmits said ticket/card ID to said local server;

said local server transmits said ticket/card ID to said center server;

said center server retrieves whether said ticket/card ID exists and when determining that said ticket/card ID exits, transmits an IC chip ID corresponding to said ticket/card ID to said local server; and said local server stores said ticket ID and said IC chip ID by making the correspondence therebetween.

3. A center server capable of managing identification information for managing a ticket/card ID of a ticket or card and an IC chip ID of an IC chip embedded in said ticket or card by making the correspondence therebetween, comprising:

a reception processing unit for receiving a new IC chip ID of a new ticket or card after reissue and an old ticket/card ID of an old ticket or card, together with a reissue request message, from a reissue terminal unit for said ticket or card;

a retrieval unit for retrieving whether said old ticket/card ID exists; and a transmission processing unit for transmitting, when the existence of said old ticket/card ID in the database is determined, a reissue permission message to said reissue terminal unit and transmitting at least one of an old chip ID corresponding to said old ticket/card ID and said old ticket/card ID and said new IC chip ID, together with a reissue notification message, to a local server.

4. A center server according to claim 3 further comprising an update processing unit responsive to a reissue of said ticket or card to update the relation between new and old tickets or cards in said database.

5. A center server according to claim 3, wherein said transmission processing unit transmits to said local server information of the relation between new and old tickets or cards accompanied by the reissue of said ticket or card.

6. An identification information managing method aided by a computer for managing a ticket/card ID of a ticket/card and an IC chip ID of an IC chip embedded in said ticket or card by making the correspondence therebetween, wherein a database stores said ticket/card ID in correspondence with said IC chip ID;

a reception processing unit of said computer receives a new IC chip ID of a new ticket or card after reissue and an old ticket/card ID of an old ticket or card before reissue, together with a reissue request message, from a reissue terminal unit for said ticket or card;

a retrieval unit of said computer retrieves whether said old ticket/card ID exists in said database; and a transmission processing unit of said computer transmits, when the existence of said old ticket/card ID in said database is determined, a reissue permission message to said reissue terminal unit and transmits at least one of an old IC chip ID corresponding to said old ticket/card ID and said old ticket/card ID and said new IC chip ID, together with a reissue notification message, to a local server.

* * * * *